United States Patent [19]

LaGrange et al.

[11] 4,422,469

[45] Dec. 27, 1983

[54] SUBMERSIBLE PUMP CHECK VALVE

[75] Inventors: Nyle D. LaGrange, Bettendorf; Elmer M. Deters, Muscatine, both of Iowa

[73] Assignee: The Marley/Wylain Company, Mission, Kans.

[21] Appl. No.: 292,049

[22] Filed: Aug. 12, 1981

[51] Int. Cl.³ .............................................. F16K 15/02
[52] U.S. Cl. ................................ 137/315; 137/533.17; 137/513.3
[58] Field of Search ................ 137/315, 513.3, 533.17, 137/533.21, 533.27, 454.4; 251/120; 417/40

[56] References Cited

U.S. PATENT DOCUMENTS

| | | | |
|---|---|---|---|
| 1,364,310 | 1/1921 | Psachos | 137/533.27 |
| 3,513,875 | 5/1970 | Nelson | 137/528 |
| 3,561,472 | 2/1972 | Lamb et al. | 137/533.27 |
| 4,080,988 | 3/1978 | Robertson | 137/513.3 |
| 4,166,713 | 9/1979 | Debrey | 417/40 |
| 4,185,655 | 1/1980 | Wilkes et al. | 137/315 |
| 4,340,080 | 7/1982 | Lefrancois | 137/533.21 |

Primary Examiner—George L. Walton
Attorney, Agent, or Firm—Schmidt, Johnson, Hovey & Williams

[57] ABSTRACT

A valve element for reciprocation within a port has a body member which cooperates with a valve seat defined on a wall around the port. A plurality of resilient legs extend from the body member through the port and terminate in feet which extend radially beyond the periphery of the port. A central bore in the body member, parallel to the legs receives a locking stem which reciprocates between a locked position and an unlocked position. In the locked position, a locking disc on the stem engages projections extending radially inward from the legs to prevent the legs from moving inward, thereby locking the valve element within the port. In the unlocked position, the locking disc is out of alignment with the projections, and bevelled surfaces on the feet cooperate with the wall to cam the legs inwardly, so that the valve element can be removed from the port when it is subjected to sufficient axial force. An annular ridge on the stem cooperates with a resilient flange spaced from the body member to releasably retain the stem in its locked and unlocked positions. A pair of prongs extend from a portion of the stem outside the bore beyond the periphery of the bore and engage the valve body to prevent the separation of the stem from the valve body. A sealing ring is seated in a groove defined on a portion of the stem within the bore to prevent the flow of fluid between the stem and the body member. The body member can be used without the stem as a flow responsive flow restricting element which permits full flow in one direction and restricted flow in the opposite direction.

8 Claims, 4 Drawing Figures

SUBMERSIBLE PUMP CHECK VALVE

BACKGROUND OF THE INVENTION

This invention relates to a check valve and, more particularly, to a removable check valve especially suited for installation in a submersible pump.

Submersible pumps are often employed in wells, such as water wells, in which they are positioned several hundreds of feet below ground. In such an installation, the submersible pump is suspended by a long drop pipe or delivery pipe which is connected to the discharge head of the submersible pump. Thus, when the pump stops, the delivery pipe is full of water, so that water under considerable pressure will flow back through the pump, spinning the pump and the motor in reverse. Such reverse spinning is undesirable and can be harmful to the submersible pump and its motor. In addition, when the water flows back out of the delivery pipe, the pipe fills with air which must be moved out before water flows at the outlet on the ground surface.

In view of these problems, it has been common practice to place a check valve at the bottom of the delivery pipe to prevent the backflow of the water or other fluid being pumped. As a convenience, a check valve is now often built into the submersible pump, usually in the outlet in the discharge head, so that a check valve need not be installed separately.

It is desirable for a number of reasons that check valves built into submersible pumps be removable. For example, dirt or sand from the well often becomes lodged in the check valve, interfering with the smooth operation of the check valve and causing it to stick. Thus, it is desirable for the check valve to be removable for cleaning. Furthermore, some pump servicing operations can be performed if there is access to the inside of the pump through the outlet. Servicing in this manner eliminates the need to remove the discharge head or otherwise disassemble the pump, and providing a removable check valve permits the necessary access.

In some submersible pump applications, such as in shallow well installations, the height of fluid in the delivery pipe is not enough to cause damage by spinning the pump and motor backwards. Thus, a check valve is not needed in such an application and a removable check valve can easily be taken out, if desired.

Also in some pump systems, such as in domestic water systems, a storage tank at the ground surface is used to provide a limited amount of water for use in the system, so that the pump need not work each time water is drawn from the system. In such a storage tank, compressed air is commonly employed to force the water out of the tank and into the system. If the check valve is omitted from the submersible pump in such a system, the water will drain from the delivery pipe and the delivery pipe will fill with air when the pump stops. The air in the delivery pipe will then be compressed by the pumped water when the pump starts. This compressed air can be directed to the storage tank to provide the means for forcing the water out of the tank and into the domestic water system. Thus, in such a system, it is desirable that the check valve be removable to allow the water to drain from the delivery pipe, yet it is important where the delivery pipe is long that the water not be permitted to rush back through the pipe and spin the pump and motor in reverse.

In some submersible pump applications, the pump supplies liquid to piping systems which are buried in the ground but, because of rock strata or other considerations, cannot be buried deep enough to prevent the water inside from freezing. As in the case of water systems having storage tanks employing compressed air, it is desirable to let the water drain out of the delivery pipe, so that the water in the piping which is subject to freezing will drain, but it is again important not to allow the water flow with enough force to damage the pump or motor by reverse spinning.

Where known check valves have been employed in pumps installed in systems in which the backflow of water out of the delivery pipe has been desired, it has been a practice to drill a hole through the check valve to allow the water to drain. Of course, this renders the valve inoperable for later regular use.

SUMMARY OF THE INVENTION

It is, therefore, an object of the present invention to provide a check valve which is positively retained and yet easily removable from a submersible pump or other structure in which it is installed.

It is a further object of the present invention to provide a two-piece check valve from which one piece can be removed to leave a flow responsive flow restricting element which permits full flow up through the system, and restricted flow back toward the pump.

Toward the fulfillment of these and other objects, the check valve according to the present invention includes a valve element adapted for reciprocation within a port, cooperating with a valve seat defined on a wall around the port to permit fluid flow in one direction through the port and prevent fluid flow in the opposite direction.

The valve element is positively retained in the port by the interaction of resilient legs extending from a body member and a locking stem movable in a bore in the body member to lock the legs in a position in which feet projecting from the legs extend beyond the periphery of the port. The valve element is easily removable from the port by moving the locking stem to an unlocked position in which the resilient legs are free to move radially inward so that the feet are entirely within the periphery of the port. The feet have bevelled upper surfaces which engage the wall around the port to cam the feet to their radially inward positions as a removal force parallel to the legs and to the axis of the port is applied to the valve element. A gripping tab is provided on the top of the stem to provide a surface which may be gripped by a pair of pliers or by another suitable tool. A pair of prongs extend from a portion of the stem outside the bore, beyond the periphery of the bore to engage the body member and prevent the separation of the stem from the body member. The engagement of the prongs with the body member acts to supply a force by which the body member and the entire check valve can be removed from the port. Thus, the removal of the check valve can be accomplished in one motion.

When the check valve is separate from the port, the prongs can be forced inward with the fingers of one hand and the valve stem can be separated from the body member with the other hand. The body member can be installed by itself in the port to act as a flow responsive flow restricting element. The body member is retained in the port by the feet and is reciprocable to permit full flow in one direction through the port and restricted fluid flow in the opposite direction. Since the bore in the body member permits the flow of fluid in the first direction as well as in the opposite direction, the pressure differential across the flow restricting element is reduced, so that the resiliency of the legs biasing the feet beyond the periphery of the port is sufficient to retain the body member in the port.

DETAILED DESCRIPTION OF THE PREFERRED EMBODIMENT

Figure 1:
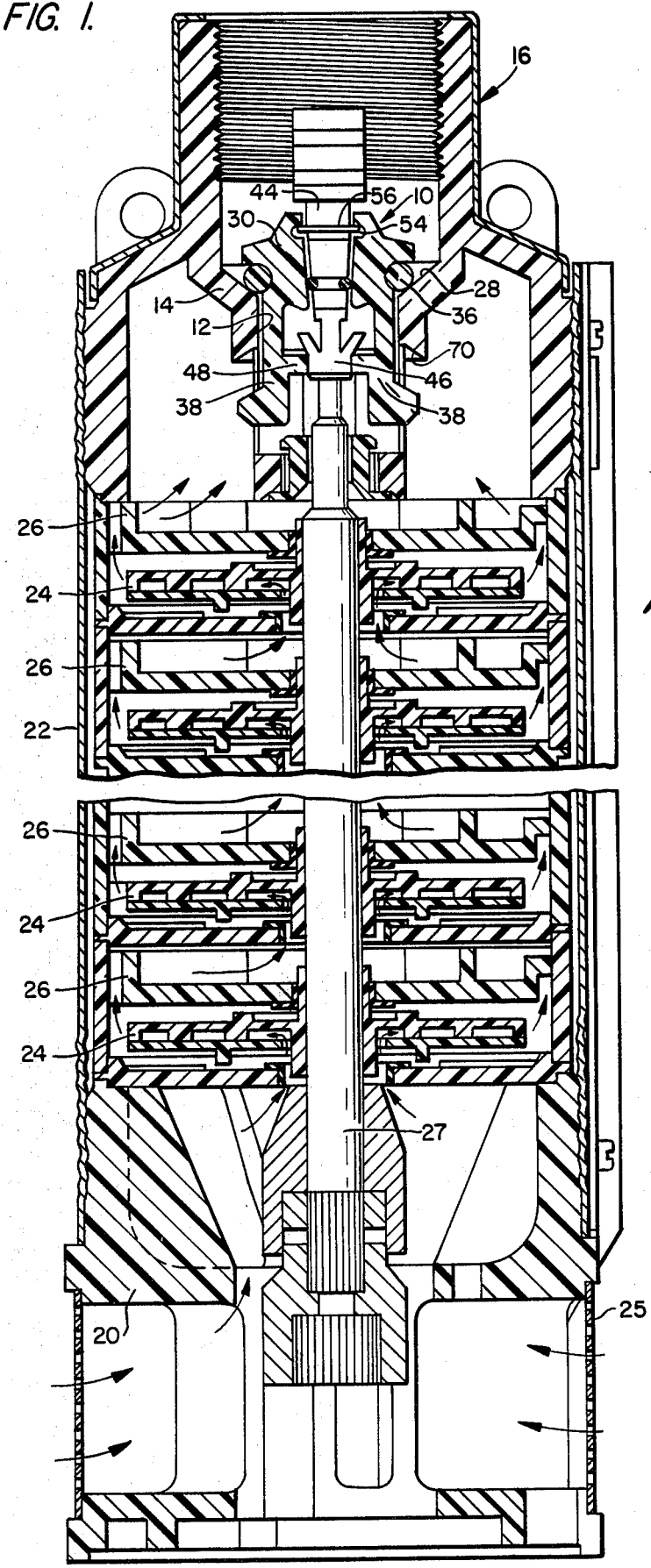
FIG. 1 is a sectional view of a submersible pump with a check valve in accordance with the present invention installed therein.

As is illustrated in FIG. 1, the valve according to the present invention includes a valve element or poppet generally designated by the reference numeral 10 mounted for reciprocation in a fluid flow discharge port 12 defined in a wall 14 of a discharge head 16 of a submersible pump 18 to act as a check valve. The submersible pump 18 includes an inlet head 20 connected to the discharge head 16 by a casing 22, and a plurality of pumping elements, such as impellers 24, which move the fluid from the inlet head 20, through the casing 22 and through the discharge port 12 in the discharge head 16. As shown by the arrows, the fluid flows into the submersible pump 18 through a screen 25 and an axial opening in the inlet head 20 to a central opening in the first impeller 24. The fluid is then moved by centrifugal force through spiral passages in the first impeller 24 to outlets (not shown) around the periphery of the first impeller 24. The fluid then flows through peripheral openings and spiral passages in a diffuser 26 to the central opening of the next impeller 24. The fluid has a corresponding flow path for each successive impeller 24 and finally enters the discharge head 16, where it flows into the discharge port 12 and acts on the underside of the check valve 10 to unseat it.

The impellers 24 are driven by a shaft 27 which is connected to the shaft of a motor (not shown) which extends from a motor section of the pump, which is attached at the bottom of the inlet head 20. The submersible pump 18 is suspended on a drop pipe or delivery pipe (not shown) which is usually connected to the discharge head 16 by a suitable means such as screw threads. The delivery pipe conducts the pumped fluid to the ground surface. The valve element 10, which normally rests in a sealing position against a valve seat 28 on the wall 14, moves upwardly, as viewed in the drawings, out of its sealing position in response to the force of the liquid on the underside of the valve element 10 to provide a path between the valve element 10 and the valve seat 28 through which the fluid can flow from within the casing 22 through the discharge head 16 to the delivery pipe. When the flow of fluid through the port 12 is terminated, the valve element 10 moves downwardly back to its sealing position under the force of gravity and the weight of the liquid in the delivery pipe, thereby preventing backflow of the liquid into the pump 18.

Figure 2:
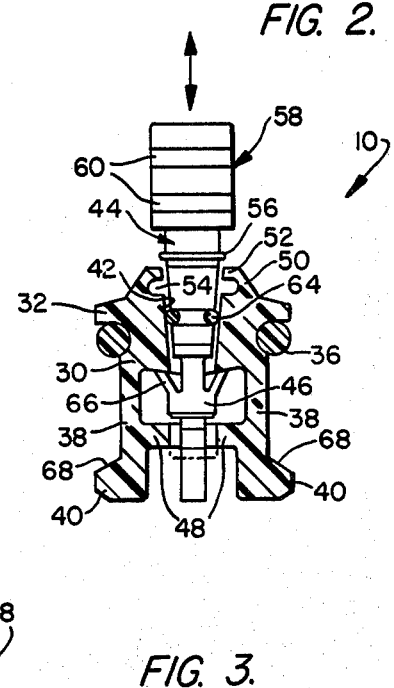
FIG. 2 is a sectional view of a portion of the check valve in accordance with the present invention.
Figure 3:
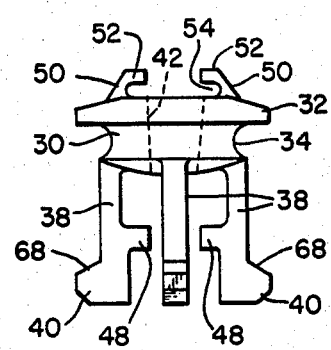
FIG. 3 is an elevational view of the check valve body member in accordance with the present invention.

As can be seen in FIGS. 2 and 3, the valve element 10 is made of a resilient material and includes a generally cylindrical body member 30 having a diameter smaller than the diameter of the discharge port 12. A radially extending flange 32 having a diameter greater than the diameter of the discharge port 12 extends from the body member 30. An annular groove 34 is defined in the body member 30 immediately adjacent to and below the flange 32 for receiving an O-ring 36 or other suitable sealing device which cooperates with the valve seat 28 on the wall 14 surrounding the discharge port 12 to provide a fluid-tight seal when the valve element 10 is in its lower or sealing position. A purality of resilient legs 38 are connected to and depend from the body member 30 to guide the valve element 10 during its reciprocating motion within the discharge port 12. Each leg 38 terminates in a foot 40 which extends radially outward beyond the periphery of the discharge port 12 and engages the wall 14 on a side opposite to the valve seat 28 to limit the upward movement of the valve element 10. The body member 30 further includes a central axial bore 42 parallel to the legs 38 for receiving a locking member in the form of a stem 44 which is adapted for reciprocal movement between locked and unlocked positions in the body member 30.

In the locked position of the stem 44, as is shown in FIG. 1, a locking disc 46 at one end of the stem 44 is positioned centrally among the plural legs 38 and engages a radially inward extending projection 48 on each of the legs 38 to prevent movement of the legs 38 radially inward, thereby preventing removal of the valve element 10 from the discharge port 12. The stem 44 is movable to an unlocked or deactivated position, as is illustrated in FIG. 2, in which the locking disc 46 is out of alignment with the radial projections 48, thereby permitting the legs 38 to be moved radially inward, so that the valve element 10 may be removed from the discharge port 12.

A pair of bosses 50 are defined on an upper surface of the body member 30 on diametrically opposite sides of the bore 42, the bosses 50 being spaced apart by a distance slightly greater than the diameter of the bore 42. Each boss 50 includes a resilient flange 52 directed radially inward, the flanges 52 including inner surfaces spaced apart a distance approximately equal to the diameter of the bore 42. Furthermore, spaces 54 exist between the upper surface of the body member 30 and the flanges 52. A protuberance in the form of an annular ridge 56 is defined on the stem 44 and is received within the spaces 54. Since the flanges 52 are made of a resilient material, a sufficient axial force on the stem 44 causes the annular ridge 56 to deform the flanges 52 and allows the stem 44 to move between its locked position in which the annular ridge 56 is constrained within the spaces 54 as shown in FIG. 1 and its unlocked position, in which the annular ridge 56 is forced out of the spaces as shown in FIG. 2. Thus, the annular ridge 56, the locking disc 46, and the entire stem 44 are releasably maintained in the locked and unlocked positions.

Figure 4:
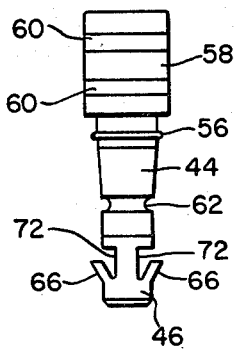
FIG. 4 is an elevational view of the check valve stem in accordance with the present invention.

As can best be seen in FIGS. 2 and 4, a gripping portion in the form of a tab 58 is included at the top of the stem 44, extending above the body member 30 where it is accessible for movement. The tab 58 has a plurality of horizontal channels 60 which help prevent a pair of pliers or other appropriate tool from slipping. An annular groove 62 (FIG. 4) is defined on the portion of the stem 44 which reciprocates within the bore 42 of the body member 30, for receiving a suitable sealing device such as an O-ring 64 (FIG. 2), which seats in the groove 62 and engages the wall of the bore 42 to prevent the flow of fluid between the stem 44 and the body member 30.

A pair of projections, in the form of resilient prongs 66, extend at an acute angle from the stem 44 outside the bore 42 of the body member 30, beyond the periphery of the bore. Upon upward movement of the stem 44 to its unlocked position of FIG. 2, the prongs 66 engage the body member 30, limiting the travel of the stem 44 and preventing the separation of the stem 44 from the body member 30. Additional movement of the stem 44 in the direction away from the body member 30, once the prongs 66 have engaged the body member 30, serves to apply a force to the body member 30 to remove it, along with the stem 44 from the discharge port 12. Each of the feet 40 on the legs 38 includes a bevelled surface 68 facing the wall 14 defining the discharge port 12, the bevelled surfaces 68 cooperating with the wall 12 to cam the legs 38 radially inward when the stem 44 is in its unlocked position and the body member 30 is moved axially away from the discharge port 12. The wall 14 also includes a bevelled surface 70 to aid in camming the legs 38 inward, but it is understood that a bevelled surface on either each of the feet 40 or on the wall 14 is sufficient to cam the legs 38 inward.

Thus, in operation, with the valve stem 44 in its locked position of FIG. 1, the flow of fluid from the submersible pump 18 through the discharge port 12 lifts the valve element 10 from its sealing position, and the engagement of the feet 40 with the wall 14 prevents the valve element 10 from moving out of the discharge port 12 with the flow of fluid. Furthermore, the legs 38 are prevented from being cammed inwardly by the engagement or abutment of the locking disc 46 with the internally extending projections 48 on the legs 38. Of course, when the flow through the port 12 is terminated, the valve element 10 will move downwardly under the force of gravity and the weight of the liquid in the delivery pipe, to its sealing position of FIG. 1.

In the event it is desired to remove the valve element 10 from the port 12 for a shallow well installation, for example, the tab 58 is gripped with an appropriate tool and moved axially away from the discharge port 12 so that the annular ridge 56 on the stem 44 deforms and snaps past the flanges 52. The stem 44 moves upwardly relative to the valve body until the prongs 66 engage the lower surface of the body member 30 as shown in FIG. 2. With the stem 44 in the unlocked position of FIG. 2, the locking disc 46 is out of alignment with the internal projections 48 of the legs 38. Therefore, when an additional axial force in the upward direction is applied to the stem 44 and therefore to the body member 30, the bevelled surfaces 68 of the feet 40 cooperate with the bevelled surface 70 of the wall 14 to cam the legs 38 radially inward so that the valve element 10 may be pulled straight out of the discharge port 12. Thus, it can be appreciated that the stem 44 and the body member 30 can be removed from the discharge port 12 with a single straight line motion.

In pumping applications where it is desirable to allow the pumped fluid to drain from the delivery pipe when pumping has terminated, but where the draining must be controlled, the body member 30 can be installed in the discharge port 12 without the stem 44. The stem 44 can be removed from the body member 30 when the valve element 10 is removed from the discharge port 12. To accomplish the removal, the prongs 66 can be forced against the bias of their own resiliency toward the stem 44 with the fingers of one hand. Depressions 72 (FIG. 4) are defined in the stem 44 adjacent to the prongs 66 to accommodate the prongs so that the prongs can be forced radially inward far enough to permit the stem 44 to pass through the bore 42 of the body member 30. The fingers of the other hand can grasp the gripping tab 58 to pull the stem 44 out of the bore 42. The body member 30 can then be pushed into position in the discharge port 12. The engagement of the feet 40 with the valve seat 28 cams the resilient legs 38 inwardly to pass through the discharge port 12. When the feet 40 have passed through the discharge port 12, they snap radially outward and engage the wall 14 on the side of the discharge port 12 opposite to the valve seat 28.

Installed in the discharge port 12 by itself, the body member 30 is a flow responsive flow restricting element. When the pump 18 operates, the flow of liquid lifts the body member 30 off of the seat 28, thereby allowing full flow up the delivery pipe. When pumping terminates, the body member 30 seals against the valve seat 28 under the force of gravity and the weight of the fluid in the delivery pipe. With the body member 30 in the sealing position, restricted flow back toward the pump 18 takes place through the bore 42, thereby permitting the delivery pipe to drain in a controlled manner. The bore 42 also allows fluid to flow through the body member 30 when fluid is being pumped. As a result, the pressure drop across the body member 30 is reduced and the resiliency of the legs 38 holding the feet 40 out in engagement with the wall 14 is sufficient to retain the body member 30 in the discharge port 12 against the force of the pumped fluid.

Although it is apparent from the foregoing specification that the present invention is well adapted to operate as a check valve in a submersible pump, it is understood that the principles of the invention allow its employment in other valving applications and that various changes and modifications may be made without departing from the spirit and scope of the present invention as recited in the appended claims and their legal equivalents.

What is claimed is:
1. A check valve comprising:
a casing having walls defining a fluid passageway and a pair of openings respectively located on opposite ends of said passageway and in communication therewith;
check valve means operably located in said passageway and shiftable between a flow and a non-flow position for permitting fluid flow in one direction through said passageway with said valve means in said flow position and for normally preventing fluid flow through said passageway in a second direction opposite said one direction with said valve means in said non-flow position, said valve means including
a body member having structure defining a bore therethrough;
a plurality of elongated, yieldable, resilient legs having engagement means and coupled to said body, said legs being shiftable from a radially-outward position for preventing removal of said check valve means from said passageway to a radially-inward position for permitting removal of said valve means from said passageway; and
an elongated stem normally disposed through said body member bore and having locking means adjacent one end, said stem being axially shiftable for permitting said locking means to engage said legs into said radially-outward position and for permitting said locking means to disengage from said legs for allowing said legs to yield into said radially-inward position.

2. In a check valve as set forth in claim 1, said legs each having an inwardly extending stop and said locking means including an outwardly extending abutment structure for engaging said leg stops and maintaining said legs in said radially-outward position and for permitting radially-inward movement of said legs when said stem is axially shifted.

3. In a check valve as set forth in claim 1, said stem including removal means adjacent said locking means for engaging said body member for removing said check valve means from said passageway upon axial movement of said stem in said one direction and said legs yieldably moving into said radially-inward position.

4. In a check valve as set forth in claim 3, said removal means including a plurality of obliquely oriented, outwardly extending, yieldable prongs shiftable into a juxtaposed orientation with said stem for removal of said stem from said valve means.

5. A check valve as set forth in claim 1, said stem having retention means for normally retaining said stem in said bore and operable for removing said stem from said bore for permitting fluid flow through said bore in either said one or said second direction.

6. A check valve as set forth in claim 1:
said passageway defining walls including structure defining a restriction therein, said restriction having a seating surface at one end thereof and a camming surface at the other end thereof;
each engagement means presenting an outwardly extending foot portion for engaging said restriction other end with said legs in said radially-outward position;
said stem including removal means for operably engaging said body member and for removing said valve means from said passageway upon movement of said stem generally in said one direction whereby said camming surface engages said respective foot portions inwardly shifting said foot portions for passage through said restriction.

7. A check valve as set forth in claim 6, said body member having an outwardly extending flange operably engaging said seating surface with said valve means in said non-flow position.

8. A check valve as set forth in claim 6, said foot portions each having a beveled surface and said stem being axially shiftable from a locked position wherein said locking means engages said legs into said radially-outward position, to an unlocked position wherein said locking means disengages from said legs, and further axial shifting of said stem generally in said one direction causes said beveled surfaces to contact said camming surfaces compressing said legs into said radially-inward position for passage through said restriction.

* * * * *